(No Model.)
E. R. & H. A. COWLES & M. OSBORN.
PERFUMERY CHARGED CANE AND OTHER HANDLES.
No. 295,359. Patented Mar. 18, 1884.
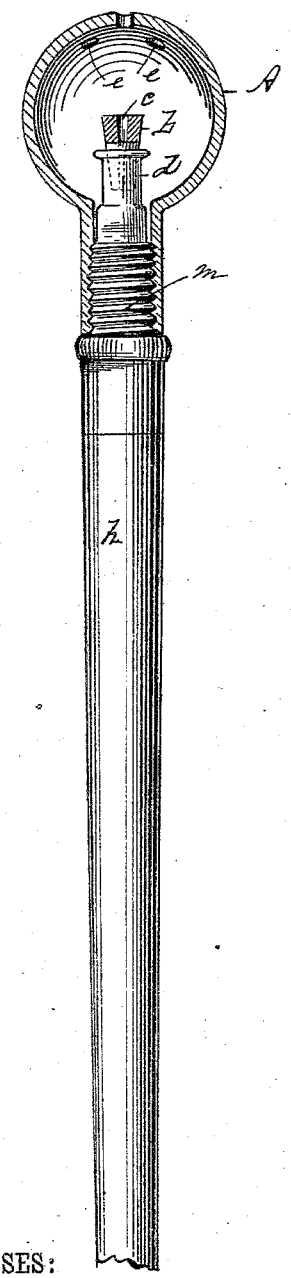
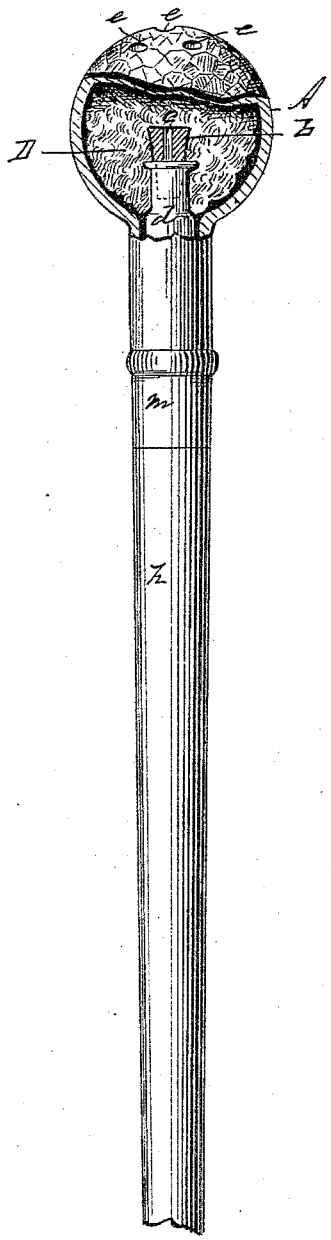
WITNESSES:
INVENTORS
BY
ATTORNEY

UNITED STATES PATENT OFFICE.

EZRA R. COWLES, HENRY A. COWLES, AND MARTIN OSBORN, OF WEST-
FIELD, MASSACHUSETTS.

PERFUMERY-CHARGED CANE AND OTHER HANDLES.

SPECIFICATION forming part of Letters Patent No. 295,359, dated March 18, 1884.

Application filed January 21, 1884. (No model.)

*To all whom it may concern:*

Be it known that we, EZRA R. COWLES, HENRY A. COWLES, and MARTIN OSBORN, citizens of the United States, residing at Westfield, in the county of Hampden and State of Massachusetts, have invented new and useful Improvements in Perfumery - Charged Cane and other Handles, of which the following is a specification.
This invention relates to improved perfumery attachments for the handles of canes, umbrellas, whips, and analogous articles, the object being to provide within a hollow handle of said objects means for holding a certain quantity of perfumery, and a knob or handle so constructed as to permit the odor of the perfume within it to escape through its shell, said perfumery being held in a receptacle from which it may be made or permitted to escape.
In the drawings forming part of this specification, Figures 1 and 2 illustrate the knobs and portions of handles embodying our invention.

In the drawings, $h$ indicates the handle end of a cane, whip, umbrella, or other similar object, on the end of which is properly secured a knob-connection, $m$, of ferrule-like formation at one end, to receive the end of the stick $h$, and having its opposite end made hollow and provided with a screw-thread on its outer surface.

The knob or handle A is made hollow, and is adapted to be screwed onto the connection $m$, as shown. If preferred, the connection $m$ may be omitted and the end of the stick be made hollow, and the knob A be screwed directly onto the latter. A vial, $d$, or other suitable receptacle for liquid perfumery, is placed in the hollow end of the connection $m$ or stick $h$, having a stopper, $b$, provided with a passage, $c$, through it, or other suitable means for letting the contents of the vial $d$ escape therefrom into the interior of the knob A. The shell of the knob A is provided with perforations $e$, to permit the odor of the perfume to escape from within it, and the knob may be filled with cotton D, or other similar absorbent material, as shown in Fig. 2; or the absorbent material may be left out, as in Fig. 1, and by swinging the end of the stick on which the knob is the contents of the vial $d$ will be thrown through the passage $c$ into the knob, and the odor thereof will escape through the perforations $e$. The material D, Fig. 2, may be from time to time supplied with perfume by a like swinging movement of the stick; or the vial may be provided with a stopper of felt, sponge, or other similar material which would, by absorption, gradually draw up the contents of the vial and disseminate them within the knob.

What we claim as our invention is—

1. A knob or handle of a cane or other analogous article, made hollow, and having its shell perforated, and having within it a receptacle for perfumery and a perfume-absorbing material, said receptacle having a stopper capable, by means substantially as described, of permitting more or less of the contents of the receptacle to escape through it, substantially as set forth.

2. A knob or handle of a cane or other analogous article, made hollow, and having its shell perforated, and having within it a receptacle for perfumery, said receptacle having a stopper capable, by means substantially as described, of permitting more or less of the contents of the receptacle to escape through it, substantially as set forth.

EZRA R. COWLES.
      HENRY A. COWLES.
      MARTIN OSBORN.

Witnesses:
 J. R. DUNBAR,
 M. B. WHITNEY.